(12) United States Patent
Mosek

(10) Patent No.: US 8,037,468 B2
(45) Date of Patent: Oct. 11, 2011

(54) METHODS FOR SYNCHRONOUS CODE RETRIEVAL FROM AN ASYNCHRONOUS SOURCE

(75) Inventor: Amir Mosek, Tel Aviv (IL)

(73) Assignee: SanDisk IL Ltd., Kfar Saba (IL)

(\*) Notice: Subject to any disclaimer, the term of this patent is extended or adjusted under 35 U.S.C. 154(b) by 1105 days.

(21) Appl. No.: 11/772,226

(22) Filed: Jul. 1, 2007

(65) Prior Publication Data
US 2008/0077923 A1 Mar. 27, 2008

Related U.S. Application Data

(60) Provisional application No. 60/821,138, filed on Aug. 2, 2006.

(51) Int. Cl.
*G06F 9/44* (2006.01)
*G06F 13/14* (2006.01)
(52) U.S. Cl. ................. 717/168; 710/260; 710/267
(58) Field of Classification Search .................. 717/168; 710/260, 267
See application file for complete search history.

(56) References Cited

U.S. PATENT DOCUMENTS

| | | | |
|---|---|---|---|
| 4,627,055 A * | 12/1986 | Mori et al. .................. 714/11 |
| 4,768,149 A * | 8/1988 | Konopik et al. ............. 710/47 |
| 4,819,154 A | 4/1989 | Stiffler et al. |
| 5,175,853 A * | 12/1992 | Kardach et al. ............. 710/260 |
| 5,276,888 A * | 1/1994 | Kardach et al. ............. 710/261 |
| 5,606,696 A * | 2/1997 | Ackerman et al. ........... 718/108 |
| 5,768,617 A * | 6/1998 | Liu .............................. 710/5 |
| 5,815,696 A | 9/1998 | Tanaka et al. |
| 5,852,729 A * | 12/1998 | Limberis et al. ............. 712/225 |
| 6,185,639 B1 * | 2/2001 | Kailash et al. ................ 710/48 |
| 6,219,727 B1 * | 4/2001 | Kailash et al. ................ 710/48 |
| 6,711,043 B2 * | 3/2004 | Friedman et al. ............. 365/51 |
| 6,775,734 B2 | 8/2004 | Chang |
| 6,973,417 B1 * | 12/2005 | Maxwell et al. ................ 703/2 |

FOREIGN PATENT DOCUMENTS
EP 0872799 10/1998

\* cited by examiner

*Primary Examiner* — Van Nguyen
(74) *Attorney, Agent, or Firm* — Martine Penilla & Gencarella, LLP

(57) ABSTRACT

The present invention discloses methods for delivering code to a host system including the steps of: accepting a CPU request, from a host-system processor of the host system, for a code segment; initiating a retrieval process to retrieve the code segment; upon expiration of a predetermined time, checking whether the code segment is ready for delivery; upon the predetermined time expiring before the code segment is ready for delivery, providing an SWI that is different than the code segment; and upon the predetermined time expiring after the code segment is ready for delivery, providing the code segment. Preferably, the SWI causes the host-system processor to jump to a reset-vector address. Most preferably, the reset-vector code, located at the reset-vector address, includes a command to request the code segment again.

12 Claims, 1 Drawing Sheet

METHODS FOR SYNCHRONOUS CODE RETRIEVAL FROM AN ASYNCHRONOUS SOURCE

RELATED APPLICATIONS

This patent application claims priority under 35 U.S.C. §119(e) to U.S. Provisional Application No. 60/821,138, filed Aug. 2, 2006, which is hereby incorporated by reference in its entirety.

This patent application is related to U.S. patent application Ser. No. 11/772,225 of the same inventor, which is entitled "SYSTEMS FOR SYNCHRONOUS CODE RETRIEVAL FROM AN ASYNCHRONOUS SOURCE" and filed on the same day as the present application. That patent application, also claiming priority to U.S. Provisional Application No. 60/821,138, is incorporated in its entirety as if fully set forth herein.

FIELD AND BACKGROUND OF THE INVENTION

The present invention relates to methods for code-delivery management capable of handling demand-paging code, independent of a host-system processor and operating system, and without latency.

Memory-management systems are well-known in the art of computer engineering as means for enhancing the performance of fast, random-access memory (RAM) by dynamically swapping sub-areas of RAM with other larger (but slower) storage memory, so that the fast RAM can always be available for use in program execution. Such systems are controlled by a memory-management unit (MMU).

In the prior art, a typical memory-management system includes a host processor (having an internal or external MMU), non-volatile memory (NVM, which is a large, but slow, memory), and RAM (which is typically fast, small volatile memory (VM) for code execution).

The MMU typically maps areas in the RAM to the NVM. The host-system processor loads code in the following ways:
  (a) upon application request, when one application intentionally attempts to load and run another application that happens to be stored in the NVM (e.g. the dynamic-link library, or DLL, in MS Windows™);
  (b) upon page fault, when an unintentional "page fault" situation occurs, the MMU is responsible for loading the data from the NVM, and does so using the following sequence of operations:
    (i) code caching: when possible, the MMU keeps the active code in a cache memory, eliminating the need for the host-system processor to read the code from an external resource (e.g. DRAM/RAM or any external storage device); this reduces the number of transactions (reducing power consumption), and improves processor performance and throughput;
    (ii) mapping virtual addresses to physical addresses, using virtual-to-physical conversion tables enables software programs to implement a mechanism for demand paging, as explained below, and typically used by various operating systems (e.g. Windows Mobile, Symbian, and Linux);
    (iii) a demand-paging mechanism is one of several implementations (enabled by the MMU) that makes the virtual-memory space equivalent to, or larger than, the physical-memory space;
      (A) When a demand-paging mechanism is activated, and the host-system processor tries to read content (e.g. during code execution or data used by code) from the virtual-memory space, the MMU calculates the requested virtual page, and looks for the page in the internal cache;
      (B) If the page is not in the cache, the MMU looks in the virtual-to-physical table for the physical address in the RAM where the code or data is located;
      (C) If the code or data is not mapped to a RAM physical address (and therefore cannot be retrieved), then a page fault occurs; and
      (D) In response to the page fault, the MMU invokes an exception-interrupt to the host-system processor, which is expected to provide the missing page from the NVM.

The main problem with the prior-art approach described above is the complexity of the process. Such a process becomes difficult to handle due to the plurality of management systems, drivers, and protocols that are involved. In the prior art, Microsoft Windows CE (4.2 and higher versions) supports demand paging. To support the demand-paging mechanism, a developer needs to provide specialized integration for the operating system. During development, the developer needs to install a file-system driver and a block device driver, and format the storage memory in a unique way (i.e. not similar to any integration required for storage memory that does not store code for demand paging).

A memory-management system in which the host-system processor requests data from one location, and always gets the data from that location (either directly or indirectly), is needed. However, the host-system processor demands to get the data synchronously, and within a very short response time (e.g. typically 4-5 clock cycles). Since some of the system components (e.g. the NVM) cannot work synchronously and/or are unable to provide data within the required response time, such a solution is difficult to provide. Such a scenario, together with the fact that the host-system processor cannot be externally interrupted during an operation, is why the cumbersome approach of the prior art appears to be the only possible solution.

It would be desirable to provide a memory-management system that is able to synchronously serve the demand of a host-system processor for code, providing the code wherever the code is stored (i.e. in the cache, in the RAM or in the NVM).

SUMMARY OF THE INVENTION

It is the purpose of the present invention to provide methods for code-delivery management capable of handling demand-paging code, independent of a host-system processor and operating system, and without latency.

For the purpose of clarity, several terms which follow are specifically defined for use herein. The terms "program counter" and "PC" are used herein to refer to an internal register in a host-system processor that includes the address of the current command to be executed by the host-system processor. The PC is incremented automatically by the host-system processor when the processor completes command execution. The PC can be set to any address by the host-system processor using special "branch" or "jump" commands.

The terms "software interrupt" and "SWI" are used herein to refer to a processor command that automatically sets the PC to a "reset-vector" address. Upon jumping to the reset-vector address, the host-system processor immediately starts executing code located at that address. The term "software-interrupt handler" is used herein to refer to code that is located in the reset-vector address, and is executed upon software-interrupt execution by the host-system processor.

The term "processor cache" is used herein to refer to a portion of memory that has the fastest performance, and typically a limited volume, in a computing system. The term "page" is used herein to refer to the smallest unit of data used for memory management in a given system (typically 2-4 Kbytes). The term "segment" is used herein to refer to a set of sequential pages having the same type of usage (e.g. loading or storing method in VM and NVM).

The term "code" is used herein to refer to a set of processor commands that can be executed by a processor. The term "resident code" is used herein to refer to code that once loaded in VM, remains resident in the VM, and does need to be loaded from the NVM upon request. The execution of resident code does not involve latency.

The term "CPU atomic operation" is used herein to refer to a CPU operation that cannot be interrupted by any event (e.g. hardware or software interrupt), and thus, if started, will always be completed. The terms "code-delivery server" and "CDS" are used herein to refer to a hardware controller that is connected to a host-system processor by a main-memory bus. The CDS is connected to the main system memory by a system memory bus, or embedded inside main system memory. Every access request to the main system memory goes through the CDS before the request reaches the main system memory. In the present invention, the CDS is responsible for delivering one of the following in response to a CPU request for a given command code: (a) a command code from main system memory, or (b) a SWI that is different from the requested command code.

The term "code segment table" is used herein to refer to a table, maintained in the host-system processor, in which each code segment is represented by a start address or segment number and length of the command code.

In a preferred embodiment of the present invention, a memory-management system is taught that satisfies synchronous CPU requests for command code, providing the code from a variety of sources (some of which are asynchronous).

In another preferred embodiment of the present invention, a memory-management mechanism is taught that provides a host-system processor with a synchronous response for any code read-request, whether the requested code is available in VM or not. Every access request to VM is routed through the CDS. Upon receiving a code read-request from the host-system processor, the CDS forwards the requests to the main VM, receives the requested data from the main VM, and delivers the data from the VM to the host-system processor. The host-system processor requires code (i.e. data read-requests) to be delivered within a few clock pulses (typically 3-5 pulses in DRAM). If the code is already located in VM, this timeframe is typically adequate. However, if the code is not resident in VM, and has to be loaded from NVM, this timeframe is insufficient for the CDS to retrieve the code from NVM.

In a preferred embodiment of the present invention, in the case that requested code cannot be delivered on time by the CDS from VM (since the code might be stored in NVM or another slow storage device), the CDS avoids a situation of latency by providing the host-system processor with "replacement code" in the form of an SWI. The host-system processor reads and executes the SWI instead of the actual code. Upon execution of the SWI, the host-system processor, in one CPU atomic operation, disables hardware interrupts, stores all the CPU registers and statuses, and jumps to a reset-vector address.

The reset vector includes code that causes the host-system processor to execute program code in a finite loop ("wait-in-loop"). When the host-system processor completes the reset-vector program, the host-system processor restores the CPU registers and statuses, enables the hardware interrupts, and jumps back to the address that initiated the SWI (performed all within the time of one CPU atomic operation).

If the CDS has not managed to load the actual requested code from NVM to VM while the host-system processor was executing the reset-vector program, the CDS provides an SWI again, so that the host-system processor will jump again, as mentioned above, to the reset-vector wait-in-loop program. These processes are repeated until the CDS has completed the retrieval of the requested code from NVM. When the CDS has completed the retrieval of the actual requested code, the CDS waits for the next time the host-system processor requests the code again. Upon the next request, the code is delivered.

The results of such a procedure are that the host-system processor's need for fast response is fully satisfied, while the memory-management system has enough time to retrieve the data. While such a procedure may seem inefficient in terms of "visits per page", the procedure is very efficient in terms of programming, integration, and code maintenance.

In another preferred embodiment of the present invention, the CDS distinguishes between resident code and data. The CDS can distinguish between code and data according to parameters loaded during boot time from internal NVM (e.g. ROM or flash memory), loaded by registers that are programmed during production or development stages, or initialized by an application, executed by the host-system processor, at boot time (i.e. the application loads the parameters from NVM).

The CDS holds an internal virtual-to-physical table that maps between virtual-memory addresses of resident-code segments and physical-memory addresses of resident-code segments. Each entry in the table represents a segment number, and includes the physical address of the virtual-memory segment-number in the main system memory.

Upon an access request from the host-system processor to read or write data, the CDS carries out the following sequence of steps:

(1) the CDS detects the access request, and determines whether the request is a read- or write-request;
(2) if the request is not a read-request, the CDS directs the request to the main system memory in order to avoid any latency;
(3) if the request is a read-request, the CDS checks if the requested data address belongs to a segment that may not be in VM, according to the a priori parameters mentioned above;
(4) if the requested data address is in VM, then the sequence stops, and the request is forwarded to the main system memory for delivery;
(5) if the requested data address is not in VM, then the CDS converts the virtual address to the physical address;
(6) the CDS then sends a read request from the calculated physical address to the main system memory;
(7) the CDS then checks the virtual-to-physical table to determine whether the requested data is already located in the main system memory ("data existing"), or should be loaded to the main system memory ("data missing");
(8) if the requested data exists in VM, then the CDS stops the sequence of retrieving the data from NVM, and waits for the data to be retrieved from VM; and
(9) if the requested data is missing from VM, the CDS proceeds with the following sub-sequence:

(a) the CDS responds to the host-system processor with data that includes an SWI whenever the requested code has not yet been retrieved and is ready for delivery;

(b) the PC of the host-system processor points to the SWI, reads the SWI and executes the SWI;

(c) since the command that the host-system processor retrieved from the main system memory is an SWI, the host-system processor disables the interrupt, stores all the registers, and then jumps automatically to the software-interrupt handler in the reset vector (performed all within the time of one CPU atomic operation);

(d) the CDS identifies the address that caused the SWI, and calculates the virtual-memory segment-number to be loaded accordingly;

(e) the CDS then loads the data of the calculated virtual-memory segment-number from NVM to the system main memory; and (f) once the data is loaded into the system main memory, the CDS updates the virtual-to-physical table (i.e. updates the main-memory physical address of the "newly-loaded number, and marks the former page as "missing").

Therefore, according to the present invention, there is provided for the first time a method for delivering code to a host system, the method including the steps of: (a) accepting a CPU request, from a host-system processor of the host system, for a code segment; (b) initiating a retrieval process to retrieve the code segment; (c) upon expiration of a predetermined time, checking whether the code segment is ready for delivery; (d) upon the predetermined time expiring before the code segment is ready for delivery, providing an SWI that is different than the code segment; and (e) upon the predetermined time expiring after the code segment is ready for delivery, providing the code segment.

Preferably, the SWI causes the host-system processor to jump to a reset-vector address.

Most preferably, the reset-vector code, located at the reset-vector address, includes a command to request the code segment again.

These and further embodiments will be apparent from the detailed description and examples that follow.

BRIEF DESCRIPTION OF THE DRAWINGS

The present invention is herein described, by way of example only, with reference to the accompanying drawing, wherein.

DESCRIPTION OF THE PREFERRED EMBODIMENTS

Figure 1:
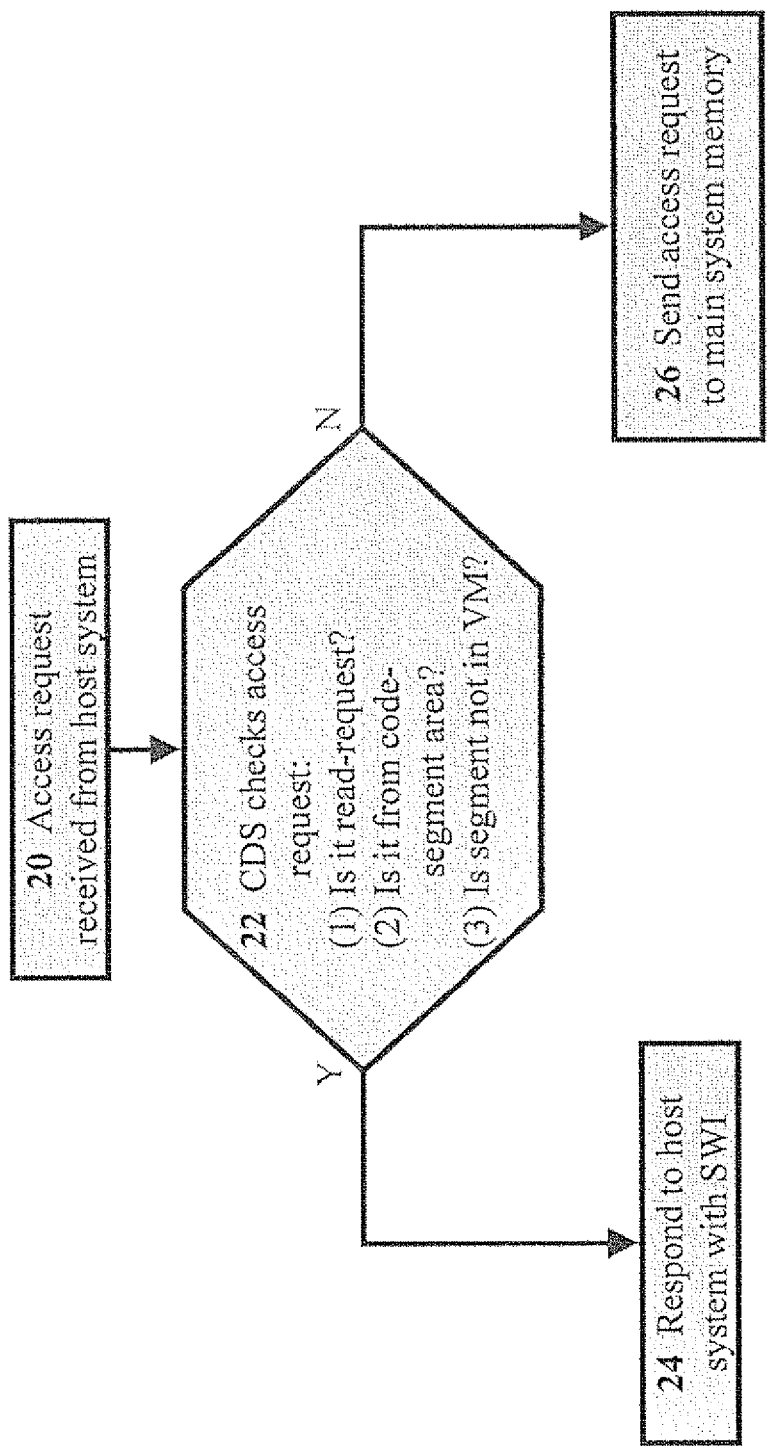
FIG. 1 shows a simplified flowchart of the retrieval process, according to preferred embodiments of the present invention.

The present invention relates to methods for code-delivery management capable of handling demand-paging code, independent of a host-system processor and operating system, and without latency. The principles and operation for code-delivery management capable of handling demand-paging code, according to the present invention, may be better understood with reference to the accompanying description and the drawing.

Referring now to the drawing, FIG. 1 shows a simplified flowchart of the retrieval process, according to preferred embodiments of the present invention. Upon receiving a request from the host-system processor to read or write data (Step 20), the CDS checks the request for the following (Step 22):

(1) Is the request a read-request?

(2) Does the data belong to a segment that is included in one of the "code-segment" areas?

(3) Is the segment not located in VM (i.e. "data missing")?

If the answers to all three questions in Step 22 are positive, the CDS responds to the host-system processor with the SWI (Step 24). If the answer to one or more of the questions in Step 22 is negative, the CDS forwards the access request to the main system memory (Step 26). It is noted, regarding the first two questions in Step 22, that the present invention mainly relates to read-requests and to code, as opposed to data.

An example of filler code that has a processor command that changes the PC value to a specific address value (i.e. the reset-vector address) is the code: swi 0x1 (a software interrupt with input parameter 1). The processor command in this example is an SWI. The software-interrupt handler knows how to handle the SWI according to the input parameter. When the host-system processor executes the SWI, all other interrupts are disabled, all registers are stored automatically to a specific location, and the PC value is changed to the reset vector. Changing the PC by invoking the SWI, the PC stores all registers in a stack, and jumps automatically to the reset-vector address.

A sample of reset-vector code (i.e. the software-interrupt handler), which is located at the reset-vector address, and executed upon receiving an SWI after all other interrupts are disabled, is shown below.

| (1) | push r4; | (push register) |
|---|---|---|
| (2) wait in loop of 1000; | | |
| (3) | mov r4, #1000; | (init r4 (counter) to 1000) |
| (4) L1 | subs r4, r4, #1; | (label 1: decrement r4) |
| (5) | nop; | (wait) |
| (6) | bne % B1; | (if r4 ≠ 0, jump to L1) |
| (5) end of loop; | | |
| (6) | pop r4; | (pop register) |
| | | (curently lr value is SWI + 4 (performed by SWI)) |
| (8) | subs lr, lr, #4; | (set lr value to the SWI address) |
| (9) | ret; | (jump back to SWI address) |
| | | (enable interrupts) |

When the host-system processor jumps to the reset-vector code, the interrupts are already disabled, and the registers of the host-system processor are already stored (including the "last-return" (LR) register which has the "jump-back" address for the host-system processor upon completion of executing the reset-vector code).

The reset-vector code instructs the host-system processor to loop for 1000 cycles, executing a nop command (i.e. "no operation" command). When the host-system processor completes executing the loop, the LR register is set to the address from where the SWI was called from. In the case that the host-system processor is an ARM processor, the ARM processor automatically keeps the "SWI address+4" in the LR register upon SWI execution. For calculating the SWI address, the host-system processor subtracts four from the value in the LR register. When the host-system processor executes the return command, interrupts are re-enabled, the registers are restored, the host-system processor returns to the SWI address (performed all within the time of one CPU atomic operation).

While the invention has been described with respect to a limited number of embodiments, it will be appreciated that many variations, modifications, and other applications of the invention may be made.

What is claimed is:

1. A method for delivering code to a host system, the method comprising the steps of:
    (a) accepting a CPU request for a code segment, from a host-system processor of the host system;
    (b) initiating a retrieval process to retrieve said code segment;
    (c) upon expiration of a predetermined time, checking whether said code segment is ready for delivery;
    (d) upon said predetermined time expiring before said code segment is ready for delivery, providing a software interrupt (SWI) that is different than said code segment, wherein said SWI causes said host-system processor to disable hardware interrupts, store all CPU registers and statuses, and jump to a reset-vector address to initiate a reset-vector program; and
    (e) upon said predetermined time expiring after said code segment is ready for delivery, providing said code segment.

2. The method of claim 1, wherein a reset-vector code located at said reset-vector address, includes a command to request said code segment again.

3. The method of claim 1, wherein the reset vector includes code that causes the host-system processor to execute program code in a finite loop.

4. The method of claim 1, wherein the operations of disabling hardware interrupts, storing all CPU registers and statues, and jumping to a reset-vector address are performed in one CPU atomic operation.

5. The method of claim 1, wherein after completion of the reset-vector program, the SWI causes said host-system processor to restore the CPU registers and statuses, enable the hardware interrupts, and jump back to the address that initiated the SWI.

6. The method of claim 5, wherein the operations of restoring the CPU registers and statuses, enabling the hardware interrupts, and jumping back to the address that initiated the SWI are performed in one CPU atomic operation.

7. The method of claim 1, wherein the method satisfies a synchronous CPU request for command code with code from an asynchronous source.

8. A method for satisfying synchronous requests for command code, the method comprising:
    accepting a CPU request for a code segment from a host-system processor of the host system;
    initiating a retrieval process to retrieve said code segment;
    upon determining that said code segment can be delivered on time, then providing said code request;
    upon determining that said code segment cannot be delivered on time, avoiding a situation of latency by providing the host-system processor with replacement code, the replacement code configured to cause said host-system processor, in one CPU atomic operation, to disable hardware interrupts, store all CPU registers and statuses, and jump to a reset-vector address to initiate a reset-vector program.

9. The method of claim 8, wherein the reset-vector program defines a wait-in-loop program.

10. The method of claim 8, wherein the replacement code is configured to cause said host-system processor, upon completion of the reset-vector program and in one CPU atomic operation, to restore the CPU registers and statuses, enable the hardware interrupts, and jump back to the address that initiated the replacement code.

11. The method of claim 8, further comprising:
    upon determining that the code segment has not loaded during the execution of the reset-vector program, then providing the host-system processor with replacement code again.

12. The method of claim 8,
    wherein it is determined that said code segment can be delivered on time when said code segment is located in volatile memory; and
    wherein it is determined that said code segment cannot be delivered on time when said code segment is located in non-volatile memory.

* * * * *